(12) United States Patent
Baumann et al.

(10) Patent No.: US 10,167,903 B2
(45) Date of Patent: Jan. 1, 2019

(54) DUAL CLUTCH

(71) Applicant: Schaeffler Technologies AG & Co. KG, Herzogenaurach (DE)

(72) Inventors: Michael Baumann, Lauf (DE); Dirk Reimnitz, Buhl (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 14 days.

(21) Appl. No.: 15/127,934

(22) PCT Filed: Mar. 26, 2015

(86) PCT No.: PCT/DE2015/200201
§ 371 (c)(1),
(2) Date: Sep. 21, 2016

(87) PCT Pub. No.: WO2015/144172
PCT Pub. Date: Oct. 1, 2015

(65) Prior Publication Data
US 2017/0097051 A1 Apr. 6, 2017

(30) Foreign Application Priority Data

Mar. 27, 2014 (DE) .................. 10 2014 205 773

(51) Int. Cl.
*F16D 13/70* (2006.01)
*F16D 13/38* (2006.01)
(Continued)

(52) U.S. Cl.
CPC ........... *F16D 13/70* (2013.01); *F16D 13/385* (2013.01); *F16D 13/72* (2013.01); *F16D 21/06* (2013.01);
(Continued)

(58) Field of Classification Search
CPC ........ F16D 13/385; F16D 13/40; F16D 13/70; F16D 21/06; F16D 2021/0607; F16D 2021/0669; F16D 2300/022
See application file for complete search history.

(56) References Cited

U.S. PATENT DOCUMENTS

| 2,031,311 A | 2/1936 | Harris |
| 4,116,322 A | 9/1978 | Ashfield |
| (Continued) | | |

FOREIGN PATENT DOCUMENTS

| CN | 1038144 A | 12/1989 |
| CN | 1643267 A | 7/2005 |
| (Continued) | | |

OTHER PUBLICATIONS

Agner, Ivo. Machine Translation of EP1524446 Clutch Device. Apr. 20, 2005. Espacenet.*
(Continued)

*Primary Examiner* — Huan Le
*Assistant Examiner* — Lori Wu
(74) *Attorney, Agent, or Firm* — Volpe and Koenig, P.C.

(57) ABSTRACT

The invention relates to a duplex clutch for coupling a drive shaft of a motor vehicle engine to a first transmission input shaft and/or a second transmission input shaft of a motor vehicle transmission, including a first partial clutch for coupling the drive shaft to the first transmission input shaft. A second partial clutch couples the drive shaft to the second transmission input shaft. A first actuating cup displaces a first compression plate of the first partial clutch and a second actuating cup displaces a second compression plate of the second partial clutch.

11 Claims, 14 Drawing Sheets

(51) Int. Cl.
*F16D 21/06* (2006.01)
*F16D 13/72* (2006.01)

(52) U.S. Cl.
CPC ........... *F16D 2021/0607* (2013.01); *F16D 2021/0615* (2013.01); *F16D 2021/0669* (2013.01); *F16D 2250/003* (2013.01); *F16D 2300/22* (2013.01)

(56) References Cited

U.S. PATENT DOCUMENTS

| | | | |
|---|---|---|---|
| 4,751,990 A | 6/1988 | Schraut et al. | |
| 4,848,555 A | 7/1989 | Riese et al. | |
| 6,006,883 A | 12/1999 | Husse et al. | |
| 6,997,298 B2 | 2/2006 | Janson | |
| 7,264,100 B2 | 9/2007 | Feldhaus et al. | |
| 7,766,142 B2 | 8/2010 | Kimmig | |
| 8,091,873 B2 | 1/2012 | Ogawa et al. | |
| 8,162,117 B2 | 4/2012 | Reimnitz | |
| 8,348,802 B2 | 1/2013 | Heuver | |
| 8,662,273 B2 | 3/2014 | Krebs et al. | |
| 8,674,955 B2 | 3/2014 | Wang et al. | |
| 8,905,209 B2 | 12/2014 | Krebs et al. | |
| 2001/0030099 A1 | 10/2001 | Fliege | |
| 2003/0066729 A1* | 4/2003 | Feldhaus | F16D 21/06 192/48.8 |
| 2003/0183475 A1 | 10/2003 | Gochenour et al. | |
| 2006/0289263 A1* | 12/2006 | Friedmann | F16D 13/58 192/48.8 |
| 2009/0223773 A1* | 9/2009 | Ruehle | F16D 13/58 192/107 R |
| 2010/0133056 A1 | 6/2010 | McCutcheon et al. | |
| 2010/0212440 A1* | 8/2010 | Thery | F16D 21/06 74/330 |
| 2010/0279810 A1 | 11/2010 | Heuver | |
| 2011/0088989 A1 | 4/2011 | Agner | |
| 2011/0186399 A1* | 8/2011 | Bai | F16D 21/06 192/48.1 |
| 2012/0090939 A1* | 4/2012 | Wilton | F16D 25/083 192/48.601 |
| 2012/0255826 A1 | 10/2012 | Tanaka et al. | |
| 2013/0025995 A1 | 1/2013 | Krebs et al. | |
| 2014/0048373 A1* | 2/2014 | Kirchhoffer | F16D 21/02 192/48.8 |
| 2015/0136561 A1* | 5/2015 | Mollier | F16D 21/06 192/98 |

FOREIGN PATENT DOCUMENTS

| | | | |
|---|---|---|---|
| CN | 2804479 Y | 8/2006 | |
| CN | 101115935 A | 1/2008 | |
| CN | 101300432 A | 11/2008 | |
| CN | 101526110 A | 9/2009 | |
| CN | 101542152 | 9/2009 | |
| CN | 101876355 A | 11/2010 | |
| CN | 102187107 | 9/2011 | |
| CN | 102227572 A | 10/2011 | |
| CN | 102667205 A | 9/2012 | |
| CN | 102686847 A | 9/2012 | |
| CN | 102713327 A | 10/2012 | |
| CN | 102822551 A | 12/2012 | |
| CN | 103109101 A | 5/2013 | |
| CN | 103314232 | 9/2013 | |
| CN | 103547826 A | 1/2014 | |
| DE | 3410474 A1 | 9/1985 | |
| DE | 3707918 A1 | 9/1988 | |
| DE | 10013857 A1 | 1/2001 | |
| DE | 10018677 A1 | 10/2001 | |
| DE | 102009024217 A1 | 12/2009 | |
| DE | 102009048277 A1 | 4/2010 | |
| DE | 102011018589 A1 | 10/2010 | |
| DE | 102010032867 A1 | 2/2011 | |
| DE | 19755081 B4 | 6/2011 | |
| DE | 102011014933 | 10/2011 | |
| DE | 102011017380 A1 | 11/2011 | |
| DE | 102011018558 A1 | 12/2011 | |
| DE | 102011086929 A1 | 6/2012 | |
| DE | 102011087379 A1 | 6/2012 | |
| DE | 102011100864 A1 | 11/2012 | |
| DE | 102013200408 | 7/2013 | |
| DE | 102013112591 A1 * | 5/2014 | F16D 13/71 |
| EP | 0931951 | 7/1999 | |
| EP | 1524446 | 4/2005 | |
| EP | 1563198 A1 | 8/2005 | |
| EP | 1959150 A1 | 8/2008 | |
| FR | 2783292 A1 | 3/2000 | |
| GB | 2150654 B | 2/1987 | |
| WO | 03081065 A1 | 10/2003 | |
| WO | 2011040869 A1 | 4/2011 | |
| WO | 2011137889 A1 | 11/2011 | |
| WO | 2014012543 | 1/2014 | |

OTHER PUBLICATIONS

Almert, Andreas. Machine Translation of DE102013200408. Jul. 25, 2013. Espacenet.*

* cited by examiner

US 10,167,903 B2

DUAL CLUTCH

BACKGROUND

The invention relates to a duplex clutch with the help of which a drive shaft of a motor vehicle can be coupled to a first transmission input shaft and/or a second transmission input shaft of a motor vehicle transmission.

A directly actuated duplex clutch is known for example from DE 102011014933 A1, in which two partial clutches each can be opened and closed with the help of an actuator cup, essentially stiff and axially displaceable by an actuator system, in order to allow compressing in a friction-fitting fashion a clutch disk, connected in a torque-proof fashion to a respective transmission input shaft, between respectively a counter plate and a compression plate, axially displaceable in reference to the counter plate by the allocated actuator cup.

Another generic duplex clutch is described in EP1524446B1. Here, a pressure cup is respectively actuated by an actuating organ embodied as a piston-cylinder arrangement in connection with engaging and/or release bearings. The duplex clutch shows two friction disks, respectively arranged on a transmission input shaft. Here, one compression force is respectively applied via the pressure cup in order to engage the respective partial clutch. The pressure cups are each connected via engagement bearings to the respective piston-cylinder system.

Other known clutches are lever-spring operated dry duplex clutches, simple 2-disk self-adjusting clutches to compensate wear and tear in the manual shifting field, and wet-operating clutches (both in the form of duplex as well as single clutches).

There is a constant need for improving the efficiency and reliability of a system for transmitting torque, particularly in duplex clutches.

SUMMARY

The objective of the invention is to provide measures to allow a reliable and highly efficient duplex clutch for transmitting torque.

The objective is attained according to the invention in a duplex clutch with one or more features of the invention. Preferred embodiments of the invention are disclosed in the claims and the following description, which respectively allow implementing an aspect of the invention individually or in combinations.

According to the invention a duplex clutch is provided for coupling a drive shaft of a motor vehicle with a first transmission input shaft and/or a second transmission input shaft of a motor vehicle transmission comprising a first partial clutch for coupling the drive shaft to the first transmission input shaft, with the first partial clutch comprising a counter plate, at least one first intermediate plate, at least axially displaceable in reference to the first counter plate, and a first compression plate, axially displaceable in reference to the counter plate and the first intermediate plate, for compressing first friction linings of a first clutch disk between the first counter plate and the first intermediate plate as well as between the first intermediate plate and the first compression plate, a second partial clutch for coupling the drive shaft to the second transmission input shaft, with the second partial clutch comprising a second counter plate, at least one second intermediate plate which is axially displaceable in reference to the second counter plate, and a second compression plate axially displaceable in reference to the second counter plate and the second intermediate plate for compressing second friction linings of a clutch disk between the second counter plate and the second intermediate plate as well as between the second intermediate plate and the second compression plate, a first actuator cup for gear-free displacement of the first compression plate and a second actuator cup for gear-free displacement of the second compression plate.

The respective partial clutches are accordingly actuated directly without any lever movements.

With the help of the respective intermediate plate it is possible to provide two additional friction areas for compressing friction linings of the corresponding clutch disk so that with this intermediate plate the number of friction areas of the respective partial clutch can be increased accordingly. By the increased number of friction areas an appropriately increased torque can be transmitted. Additionally or alternatively the compression force to be applied upon the respective compression plate can be reduced in order to allow transmitting a certain maximum torque. Additionally or alternatively the exterior radius of the counter plate and/or the compression plate can be reduced in order to allow transmitting a certain maximum torque. By the lower exterior radius the weight inertia of the respective partial clutch can be reduced and radial construction space can be saved. Due to the reduced weight inertia the duplex clutch is suitable particularly for applications with a sporty and/or dynamic driving behavior and/or for the reduction of fuel consumption of a motor vehicle. Simultaneously the compression force can be introduced via the respectively allocated actuator cup into the compression plate, particularly when embodied as a stiff pressure cup. This results in a compression force engaging without gears between a particularly hydraulic actuator system for providing actuating force and the friction lining of the clutch disk, allowing an actuating motion of the actuating system to be transmitted via the actuator cups to the compression plates, essentially without amplification and/or without loss. Additionally, the stiff actuator cup allows increased structural rigidity and stability of the clutch in comparison to an elastic lever spring, so that wear and tear of the component caused by instability can be avoided. Therefore the life span of the clutch can be extended.

The actuator force can be applied by a hydraulic actuating system, which particularly comprises a first ring cylinder to displace the first actuator cup with the help of the first actuator piston axially guided in the first ring cylinder and a second ring cylinder provided concentrically in reference to the first ring cylinder for displacing the second actuator cup with the help of a second actuator piston axially guided in the second ring cylinder. A first release bearing may be provided between the first actuating piston and the first actuating cup and a second release bearing between the second actuator piston and the second actuator cup.

The respective clutch disk may have one friction lining, particularly at each axial face of the resilient lining support pointing away from each other, which can contact a potentially provided friction lining of the corresponding counter plate and/or compression plate and/or intermediate plate in a friction-fitting fashion in order to close the respective clutch. The friction linings provided between the counter plate and the intermediate plate can be moved in the axial direction in reference towards each other. In the same fashion the friction linings provided between the intermediate plate and the compression plate can also be moved in reference to each other in the axial direction. It is possible that one of the two opposite friction linings is arranged fixed in the axial direction and the other friction lining is connected to the clutch disk in a fashion displaceable in the axial direction. The respective clutch disk can be connected via teeth to the respective transmission input shaft in a torque-proof but axially mobile fashion. The duplex clutch can be connected directly or indirectly to a torsional vibration damper located upstream in reference to the motor, and/or downstream in reference to the transmission, particularly a two-weight flywheel and/or centrifugal pendulum and/or weight pendulum. Further, the respective clutch disk can be damped particularly with the help of an annular damper. The duplex clutch can particularly be connected to the drive shaft via a stiff disk ("drive plate") and/or a flexible one and/or a disk flexible in the axial direction ("flex plate"), with the disk being able to transmit torque in order to allow introducing the torque of the drive shaft into the duplex clutch. By the flexible embodiment of the disk any oscillations developing can be partially damped or completely compensated. Additionally or alternatively the duplex clutch can be connected via at least one spring element, particularly a flat spring, to the drive shaft. The spring element can particularly dampen axial vibrations and/or compensate wobbling of the drive shaft and here simultaneously transmit torque.

The first counter plate and the second counter plate can be embodied as different parts that are separated from each other or embodied jointly by a common central plate. In particular, precisely one first intermediate plate or precisely two first intermediate plates or precisely three first intermediate plates are provided. Preferably precisely one second intermediate plate or precisely two second intermediate plates or precisely three second intermediate plates are provided. In case of one intermediate plate and one central plate here a duplex clutch develops according to the "five-plate design". In case of one intermediate plate each and counter plates provided separated therefrom here a duplex clutch develops according to the "six-plate design". In case of two intermediate plates each and one central plate a duplex clutch develops according to the "seven-plate design". In case of respectively two intermediate plates and counter plates provided separately here a duplex clutch develops according to the "eight-plate design". Preferably the first transmission input shaft and the second transmission input shaft are arranged coaxially in reference to each other. In particular, the interior transmission input shaft, particularly the first transmission input shaft, is located at the drive shaft. Preferably the drive shaft shows a recess at an axial face, with the interior transmission input shaft partially penetrating it and the drive shaft being supported there via a pilot bearing, for example.

It is particularly provided that the first clutch disk is provided that can be connected to the first transmission input shaft in a torque-proof fashion, with the first clutch disk comprising a first torsional vibration damper, particularly embodied as a disk damper, jointly for the first friction lining between the first counter plate and the first intermediate plate as well as for the first friction lining between the first intermediate plate and the first compression plate, and/or the second clutch disk is provided that can be connected in a torque-proof fashion to the second transmission input shaft, with the second clutch disk comprising a common second torsional vibration damper, particularly embodied as a disk damper, for the second friction lining between the second counter plate and the second intermediate plate as well as for the second friction lining between the second intermediate plate and the second compression plate. This way, respectively one torsional vibration damper each is sufficient to dampen all friction linings of the respective clutch disk and at least partially dampen and/or compensate torsional vibrations. In particular it is possible to connect the duplex clutch to the drive shaft without any torsional vibration dampers being interposed. For example, only a stiff flywheel is connected to the drive shaft in a torque-proof fashion, with the first counter plate and/or the second counter plate being connected directly or indirectly to the flywheel. Preferably the first counter plate is directly connected to the drive shaft.

In an advantageous further development of the invention it is provided that a clutch cover, connected in a torque-proof fashion to the first counter plate and the second counter plate, may be provided to cover at least a portion of the first partial clutch and/or the second partial clutch, with the clutch lid potentially being connected at a fastening site to the first counter plate and/or to the second counter plate. The clutch cover may also have, in addition to its covering function, preferably a supporting capacity. For example an actuator system or a readjusting unit may be fastened at the clutch cover.

It is particularly preferred to provide an actuating system, in particular a hydraulic, mechanical, and/or electromechanical one, for applying an actuating force engaging the first actuating cup and/or the second actuating cup, with the actuating system being supported at least at a clutch part, particularly the first transmission input shaft, at the second transmission input shaft, at a transmission housing, and/or at the clutch cover, in order to transfer loads. Here it is not necessary to fasten the actuating system via separate fastening means, for example screws, at a transmission housing, which simplifies the assembly. For example, the actuator system only rests via a stop on the transmission housing, acting in the tangential direction, to support torque, in order to prevent unintended distortion of the actuator system. In particular, the second transmission input shaft is embodied as a hollow shaft, with the first transmission input shaft being arranged inside the second transmission input shaft, coaxially in reference to the second transmission input shaft. Preferably the actuator system rests on the radially exterior second transmission input shaft.

In particular, a spring element, particularly a flex plate or flat springs resilient in the axial direction, may be provided for the torque-proof fastening at the drive shaft, with the flex plate being connected to the first counter plate and/or the second counter plate in order to introduce torque provided by the drive shaft. By the flexibility of the flex plate in the axial direction, here particularly axial oscillations can be damped and/or any wobbling of the drive shaft can be compensated. Simultaneously the flex plate can transmit the torque of the drive shaft to the first counter plate and/or the second counter plate.

Preferably a support stop may be provided to support actuating forces acting in the axial direction into the drive shaft, with particularly the first counter plate being axially mobile and/or tippable in reference to the drive shaft and the support stop being formed by the drive shaft and/or by the first counter plate and/or a part connected to the drive shaft or the first counter plate. The support stop allows transferring axial forces, particularly applied by an actuator system. Simultaneously the part abutting the support stop, particularly the first counter plate and/or the second counter plate, can lift off the support stop and/or tilt on the support stop in order to allow damping axial vibrations and/or wobbling of the drive shaft. The support stop can particularly be arranged on a small radius so that the support stop may be arranged with the drive shaft radially within a fastening of the duplex clutch, for example.

It is particularly preferred for the first counter plate and the second counter plate to be embodied by a common central plate. This way, particularly the number of components and/or the axial structural space can be reduced.

In particular, the first counter plate and/or the second counter plate can be supported via a support bearing to transfer radial forces and/or axial forces to the first transmission input shaft and/or the second transmission input shaft. With the help of the support bearing the forces acting upon the counter plates can be transferred via the first transmission input shaft and/or the second transmission input shaft, allowing to avoid particular stress upon the drive shaft.

Advantageously the first counter plate and/or the second counter plate may be connected to the support bearing via a radially acting compensation for slide offsets. The primary function of the compensation for slide offsets includes to prevent any radial warping of the drive shaft and the transmission input shafts by the clutch when said clutch is assembled at shafts which are not aligned in a completely coaxial fashion. The radially acting compensation for slide offsets may have for example an axial slide bearing, which can transfer axial forces acting in one direction, particularly actuating forces applied by an actuating system, and simultaneously can allow any lift-off in the other axial direction, particularly to a limited extent. This way, axial vibrations can be damped and/or wobbling of the drive shaft can be compensated. The radially acting compensation of slide offset is particularly provided when the duplex clutch is connected to the drive shaft via an element which is flexible in the axial direction, for example a flex plate or flat springs essentially aligned tangentially.

Preferably a torsional vibration damper may be provided, connected to the first counter plate and/or the second counter plate, particularly embodied as a two-weight flywheel, for damping torsional vibrations introduced via the drive shaft, with the torsional vibration damper comprising at least one access opening for passing a fastening element connecting the torsional vibration damper to a first counter plate and/or to the second counter plate, and/or the first counter plate and/or the second counter plate comprising an assembly opening for passing connection element connecting the torsional vibration damper to the drive shaft and/or the first clutch disk and/or the second clutch disk, and/or the first actuator cup and/or the second actuator cup comprising an assembly opening for passing a connection element connecting the torsional vibration damper to the drive shaft. The torsional vibration damper can be preassembled with the drive shaft. After the assembly of the duplex clutch, then the torsional vibration damper can directly or indirectly be connected to the first counter plate and/or the second counter plate by the fastening means being guided through the access opening. Additionally or alternatively at least one fastening element can be arranged at the duplex clutch radially at the outside. Additionally the torsional vibration damper can be preassembled with the remaining duplex clutch, with the connection element for connecting the duplex clutch to the drive shaft being passed through the corresponding assembly openings.

In order to transfer radial forces and/or axial forces it is particularly preferred for the first counter plate to be supported at the drive shaft and/or a torsional vibration damper connected to the drive shaft, particularly embodied as a two-weight flywheel, for damping torsional vibrations introduced via the drive shaft. Based on the relatively low forces occurring in the duplex clutch these forces can be transferred via the drive shaft. Here, the first counter plate can rest directly on the drive shaft or indirectly via the torsional vibration damper.

BRIEF DESCRIPTION OF THE DRAWINGS

In the following, as an example the invention is explained with reference to the attached drawings based on preferred exemplary embodiments, with each of the features illustrated in the following representing an aspect of the invention, either by itself or in combination with others. Shown are.

DETAILED DESCRIPTION OF THE PREFERRED EMBODIMENTS

Figure 1:
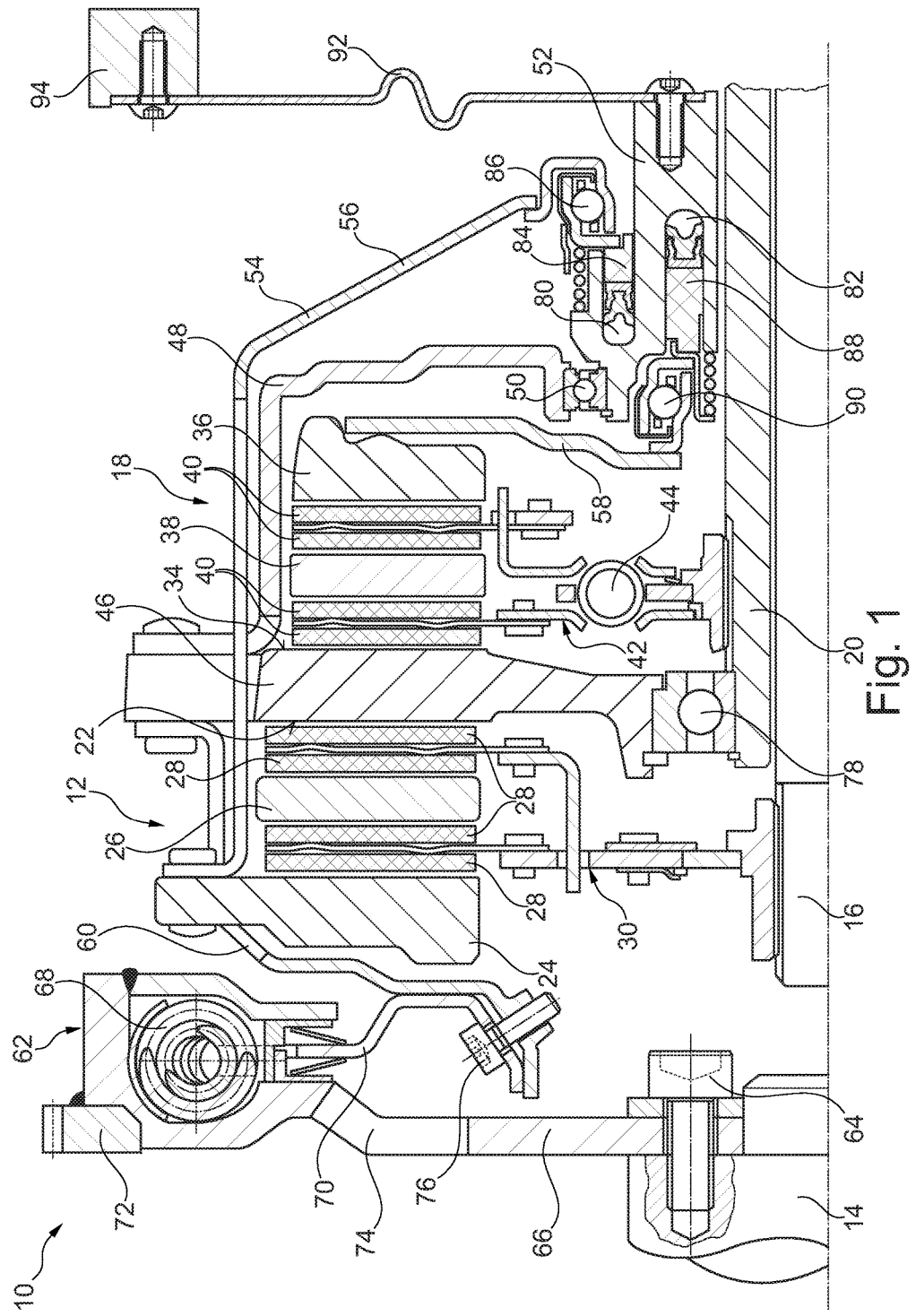
FIG. 1: a schematic cross-section of a duplex clutch in a first embodiment.

The duplex clutch 10 shown in FIG. 1 comprises a first partial clutch 12 for coupling a drive shaft 14 to a first transmission input shaft 16 and a second partial clutch 18 for coupling the drive shaft 14 to a second transmission input shaft 20 arranged concentrically in reference to the first transmission input shaft 16. The first partial clutch 12 comprises a first counter plate 22 and a first compression plate 24 axially displaceable in reference to the first counter plate 22. A first intermediate plate 26, axially displaceable, is provided between the first counter plate 22 and the first compression plate 24. First friction linings 28 of a first clutch disk 30, respectively axially displaceable in reference to each other, are provided between the first counter plate 22 and the first intermediate plate 26 as well as between the first intermediate plate 26 and the first compression plate 24. The first clutch disk 30 is connected in a torque-transmitting fashion to the first transmission input shaft 16. The second partial clutch 18 comprises a second counter plate 34 and a second compression plate 36, which is axially displaceable in reference to the second counter plate 34. An axially displaceable second intermediate plate 38 is provided between the second counter plate 34 and the second compression plate 36. Second friction linings 40 of a second clutch disk 42, each axially displaceable in reference to each other, are provided between the second compression plate 36 and the second intermediate plate 38 as well as between the second intermediate plate 38 and the second counter plate 34. The second clutch disk 42 is connected via a second disk damper 44 to the second transmission input shaft 20 in a torque-transmitting fashion. In the exemplary embodiment shown the first counter plate 22 and the second counter plate 34 are embodied by a common central plate 46 such that a "five plate design" develops.

A clutch cover 48 is connected to the central plate 46 and thus to the first counter plate 22 and the second counter plate 34, which clutch cover is connected via the cap bearing 50 to an actuating system 52. The first compression plate 24 can be axially displaced by the actuating system 52 using a first actuating cup 54 in order to compress in a friction-fitting fashion the first friction linings 28 of the first clutch disk 30 and this way engages the first partial clutch 12, or to release a friction-fitting connection of the first friction linings 28 of the first clutch disk 30 and this way opens the first partial clutch 12. In this exemplary embodiment the first actuating cup 54 is embodied as a tensile element 56. The second compression plate 36 can be axially displaced by the actuating system 52 using a second actuating cup 58 in order to compress in a friction-fitting fashion the second friction linings 40 of the second clutch disk 42 and this way engages the second partial clutch 18 or to open a friction-fitting connection of the two friction linings 40 of the second clutch disk 42 and this way opens the first partial clutch 18. The alignments of actuation for engaging the first partial clutch 12 and the second partial clutch 18 are arranged in opposite axial directions. The two actuating cups 54, 58 are essentially embodied in a stiff fashion, thus allowing the avoidance of pivotal motions of the actuating cups 54, 58. Accordingly, an actuating motion of the actuating system 52 can essentially be transferred via the actuating cups 54, 58 without amplification and without loss to the compression plates 24, 36.

In the exemplary embodiment shown the central plates 46 are connected via an entraining ring 60 and a torsional vibration damper 62, embodied as a two-weight flywheel, to the drive shaft 14. The torsional vibration damper 62 has a primary weight 66 connected to the drive shaft 14 via connection means 64 embodied as a screw, which weight via an energy storage element 68, embodied as an arc spring, is coupled in a limitedly rotational fashion to a secondary weight 70 embodied as an outlet flange. A receiving channel is embodied in the primary weight 66 for the energy storage element 68, into which the secondary weight 70 penetrates radially inwardly. Further, a gear rim 72 is connected to the primary weigh 66 for introducing a starting torque to start the engine of the motor vehicle. An access opening 74 is provided in the primary weight 66 of the torsional vibration damper 62 through which the fastening means 76, embodied as a screw, can be guided in order to screw the secondary weight 70 to the entraining ring 60.

Any forces developing in the duplex clutch by the fixed connection of the central plate 46 to the torsional vibration damper 62 can be transferred via the drive shaft 14. Additionally or alternatively the central plate 46 and thus the first counter plate 22 and the second counter plate 34 can be supported via a support bearing 78 at the exterior second transmission input shaft 20 or alternatively at the interior first transmission input shaft 16 to transfer axial forces and/or radial forces. Additionally or alternatively here axial tension can be avoided by axial elasticity in the torsional vibration damper 62 and/or the entraining ring 60 when the duplex clutch 10 is fastened at the transmission side and the torsional vibration damper 62 at the driving side.

An actuating force for displacing the first actuating cup 54 and/or the second actuating cup 58 can be applied by the actuating system 52. In this exemplary embodiment the actuating system 52 comprises a first ring cylinder 80 and a second ring cylinder 82 arranged coaxially in reference to the first ring cylinder 80. The actuating system 52 is therefore embodied as CSC (concentric slave cylinder). The two ring cylinders 80, 82 are arranged in opposite directions. A first actuating piston 84 is axially guided in the first ring cylinder 80, and engages the first actuating cup 54 via a first release bearing 86. This way the first actuating cup 54 can be operated by the actuating system 52. A second actuating piston 88 is guided in the second ring cylinder 82, engaging the second actuating cup 58 via a second release bearing 90. This way the second actuating cup 58 can be operated by the actuating system 52. In the exemplary embodiment shown the actuating system 52 is connected via a flex plate 92 to the transmission housing 94. The flex plate 92 serves as the torque support and torque proofing means for the actuator system 52 and is therefore embodied elastically in the radial direction.

Figure 2:
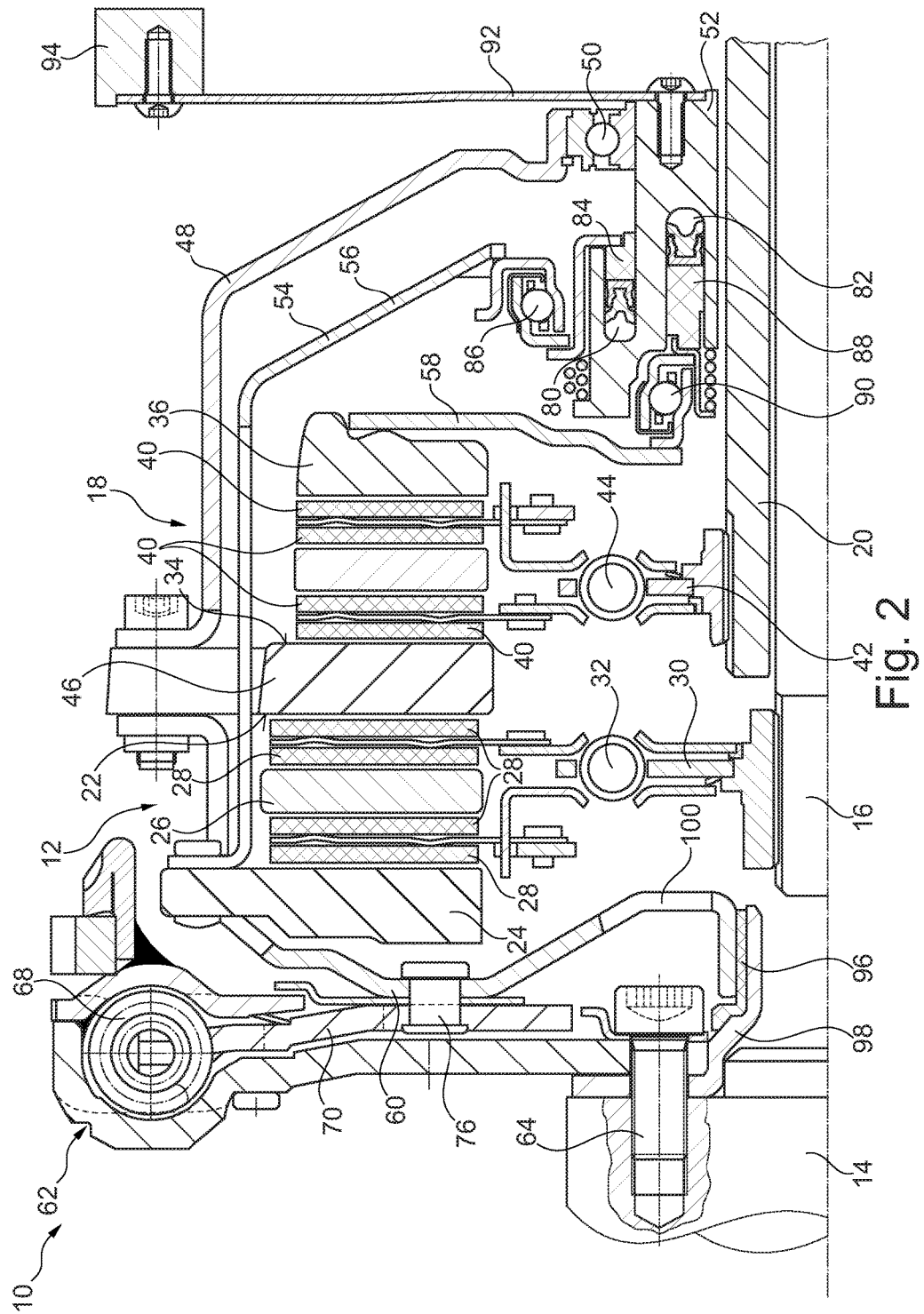
FIG. 2: a schematic cross-section of a duplex clutch in a second embodiment.

In the embodiment of the duplex clutch 10 shown in FIG. 2, compared to the embodiment of the duplex clutch 10 shown in FIG. 1, the entraining ring 60 is supported via a slide bearing 96 on the drive shaft 14. The slide bearing 96 can transfer axial and/or radial forces. For this purpose a spacer 98 carrying the slide bearing 96 is fastened by the connection means 64 provided at the drive shaft 14. The fastening means 76, connecting the secondary weight 70 to the entraining ring 60, are embodied as a rivet connection so that the torsional vibration damper 62 can be provided preassembled with the remaining duplex clutch 10. Additionally, the access opening 74 in the primary weight 66 can be waived. In order to assemble the duplex clutch 10 at the drive shaft 14 here an assembly opening 100 is provided in the entraining ring through which the connection means 64 can be guided during the assembly process. In the exemplary embodiment shown, neither the first counter plate 22 nor the second counter plate 34 rest on any of the transmission input shafts 16, 20. During the assembly of the duplex clutch 10 initially the torsional vibration damper 62 can be assembled to the drive shaft 14, with the entraining ring 60 already being preassembled with the torsional vibration damper 62. Subsequently the remaining duplex clutch 10 can be connected to the entraining ring 60. For this purpose a threaded connection is provided between the entraining ring 60 and one of the counter plates 22, 34. Assembly openings 100 in the clutch disks 30, 42 and/or the counter plates 22, 34 are not required in this case. In this exemplary embodiment not only the second clutch disk 42 is connected via a second disk damper 44 to the second transmission input shaft 20 in at torque-proof fashion, but the first clutch disk 30 is also connected via a first disk damper 32 to the first transmission input shaft 16 in a torque-transmitting fashion. This allows damping of any rotary inconsistencies occurring in the torque introduced via the drive shaft 14 by the first disk damper 32 of the first clutch disk 30 and/or by the second disk damper 44 of the second clutch disk 42. Any rotary inconsistencies can also be damped in the torsion vibration damper 62.

Figure 3:
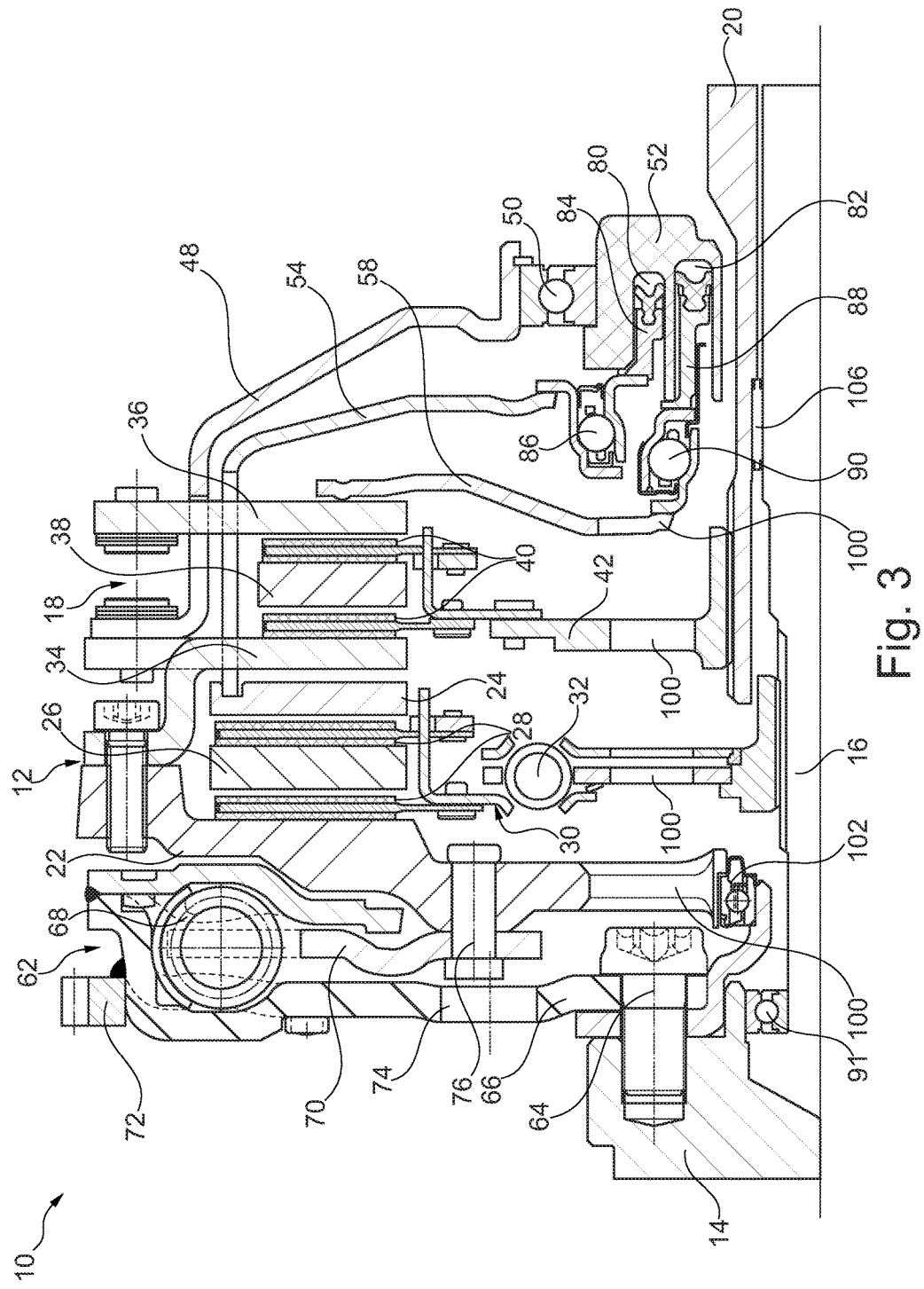
FIG. 3: a schematic cross-section of a duplex clutch in a third embodiment.

As shown in FIG. 3, compared to the embodiment of the duplex clutch 10 shown in FIG. 1 or 2, the first counter plate 22 and the second counter plate 34 can be embodied as separate components, spaced apart from each other in the axial direction such that a "six plate design" results. The alignment of actuation for engaging the first partial clutch 12 and the second partial clutch 18 show the same axial directions. Upon the first partial clutch 12 engaging, here the first actuating cup 54 is subjected to pressure.

The first counter plate 22 and the second counter plate 34 are connected to the clutch cover 48, which is connected via a cap bearing 50 to the actuator system 52, causing the actuator system 52 to be fastened to the clutch cover 48. The actuating system 52 comprises a first ring cylinder 80 and a second ring cylinder 82 arranged coaxially in reference to the first ring cylinder 80. The actuating system 52 is therefore embodied as a CSC (concentric slave cylinder). In this exemplary embodiment the two ring cylinders 80, 82 are aligned in the same direction. A first actuating piston 84 is axially guided in the first ring cylinder 80, engaging the first actuating cup 54 via a first release bearing 86. This way the first actuating cup 54 can be operated by the actuating system 52. A second actuating piston 88 is axially guided in the second ring cylinder 82 engaging the second actuator cup 58 via a second release bearing 90. This way the second actuator cup 58 can be operated by the actuating system 52. The actuating system 52 is embodied as a CSC (concentric slave cylinder). As shown in FIG. 3, the first clutch disk 30 is connected via a first disk damper 32 to the first transmission input shaft 16 in a torque-transmitting fashion. The second clutch disk 42 is connected to the second transmission input shaft 20 in a torque-transmitting fashion.

In this exemplary embodiment assembly openings 100 are provided in the first clutch disk 30 and in the second clutch disk 42 as well as in the second actuating cup 58 for passing the connection means 64 through them during the assembly process. This way the torsional vibration damper 62 can be connected in the preassembled state to the remaining duplex clutch 10, jointly with the drive shaft 14. Further, the first counter plate 22 rests via a roller bearing 102 on the drive shaft 14, by which particularly radial forces and axial forces can be transferred. Further, the first transmission input shaft 16 rests via a pilot bearing 91 on the drive shaft 14.

Figure 4:
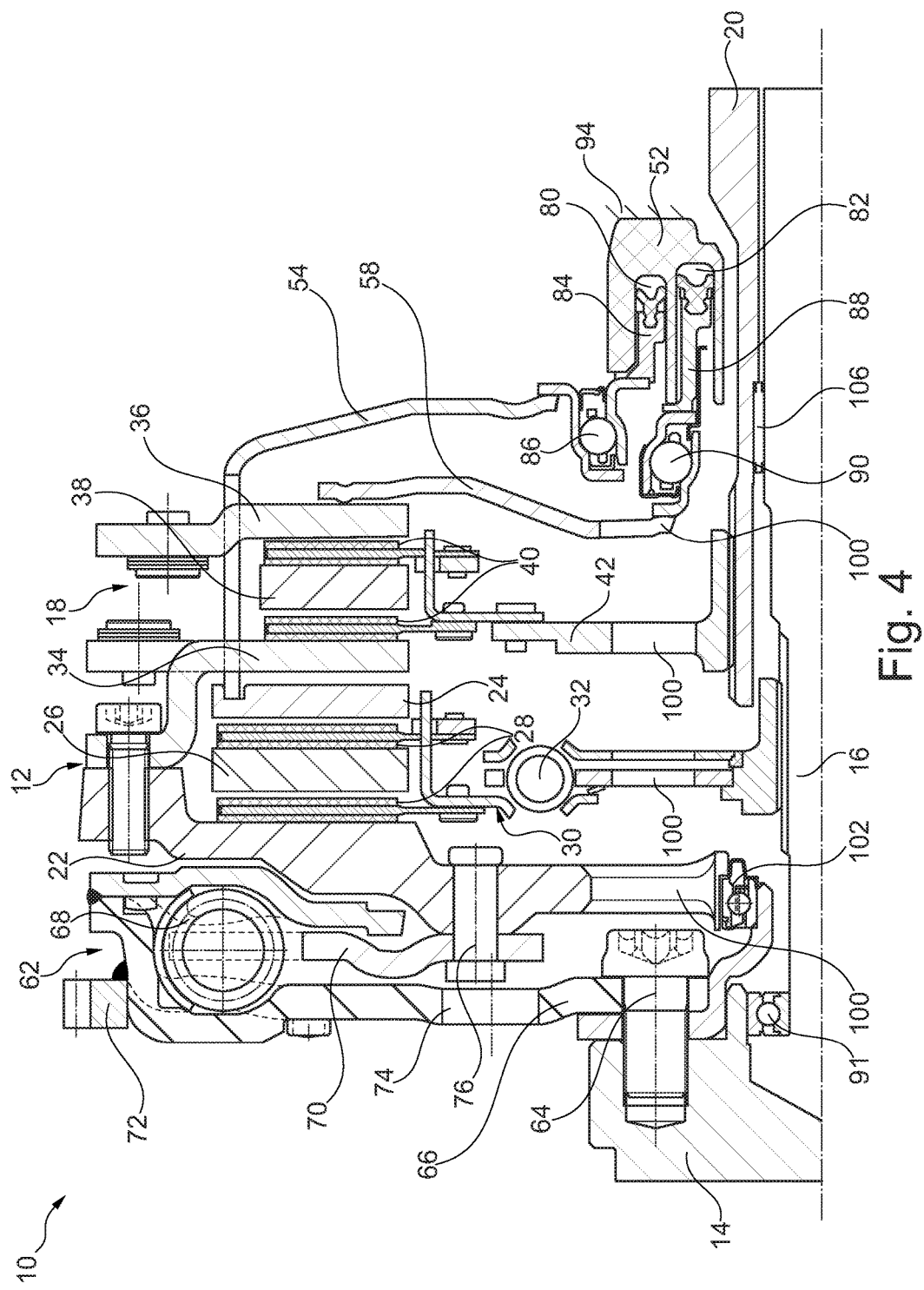
FIG. 4: a schematic cross-section of a duplex clutch in a fourth embodiment.

In the embodiment of the duplex clutch 10 shown in FIG. 4, compared to the embodiment of the duplex clutch 10 shown in FIG. 3, the clutch cover 48 is waived. In this exemplary embodiment the actuating system 52 is fastened directly at the transmission housing 94.

Figure 5:
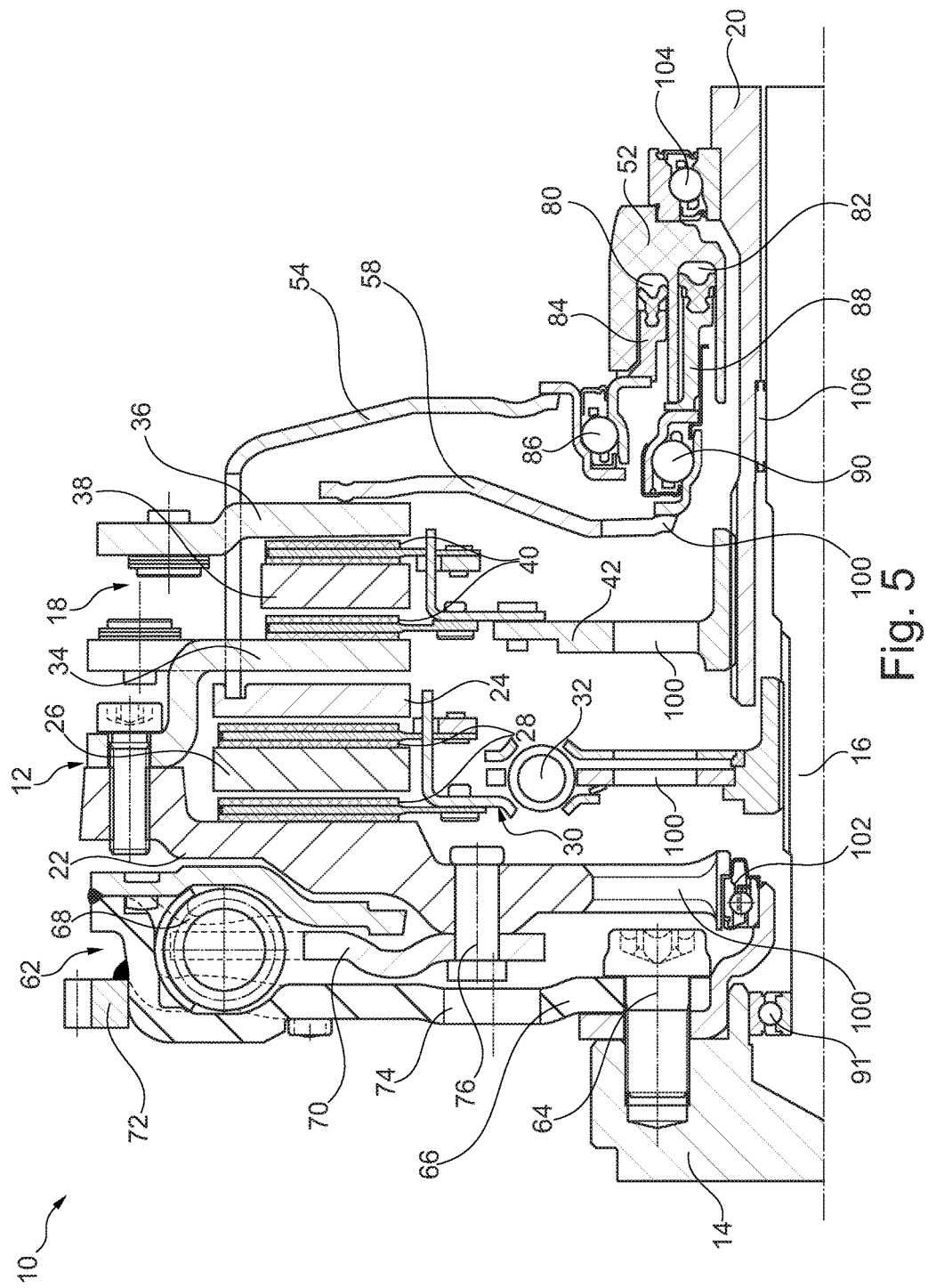
FIG. 5: a schematic cross-section of a duplex clutch in a fifth embodiment.

Compared to the embodiment shown in FIG. 4, in the exemplary embodiment shown in FIG. 5 the actuating system 52 is not connected to the transmission housing 84 but rests via a bearing 104 on the second transmission input shaft 20 for transferring radial forces and/or axial forces. Further, the second transmission input shaft 20 may be supported via a journal bearing 106 embodied as a needle bearing on the first transmission input shaft 16. Any unintentional rotation of the actuating system 52 can be prevented by torque-proofing and/or torque support.

Figure 6:
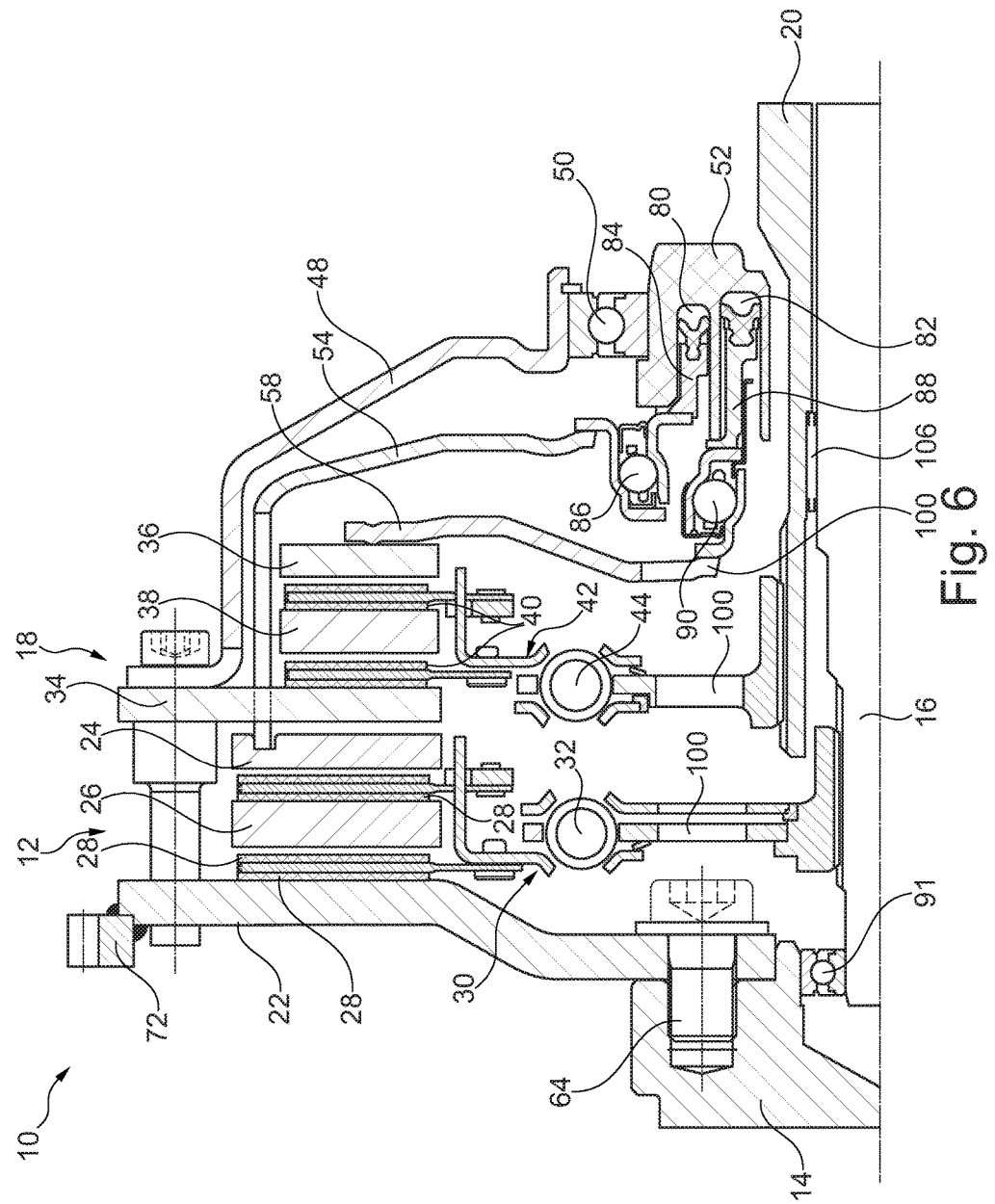
FIG. 6: a schematic cross-section of a duplex clutch in a sixth embodiment.

In the embodiment of the duplex clutch 10 shown in FIG. 6, compared to the embodiment of the duplex clutch 10 shown in FIG. 3, the torsional vibration damper 62 is waived and the first counter plate 22 is connected directly to the drive shaft 14 with the help of connecting means 64. In this exemplary embodiment the first clutch disk 30 is connected via a first disk damper 32 to the first transmission input shaft 16 in a torque-proof fashion and the second clutch disk 42 is connected via a second disk damper 44 to the second transmission input shaft 20 in a torque-proof fashion. Any cyclic irregularity occurring in the torque introduced via the drive shaft 14 is damped by the first disk damper 32 of the first clutch disk 30 and/or by the second disk damper 44 of the second clutch disk 42.

Figure 7:
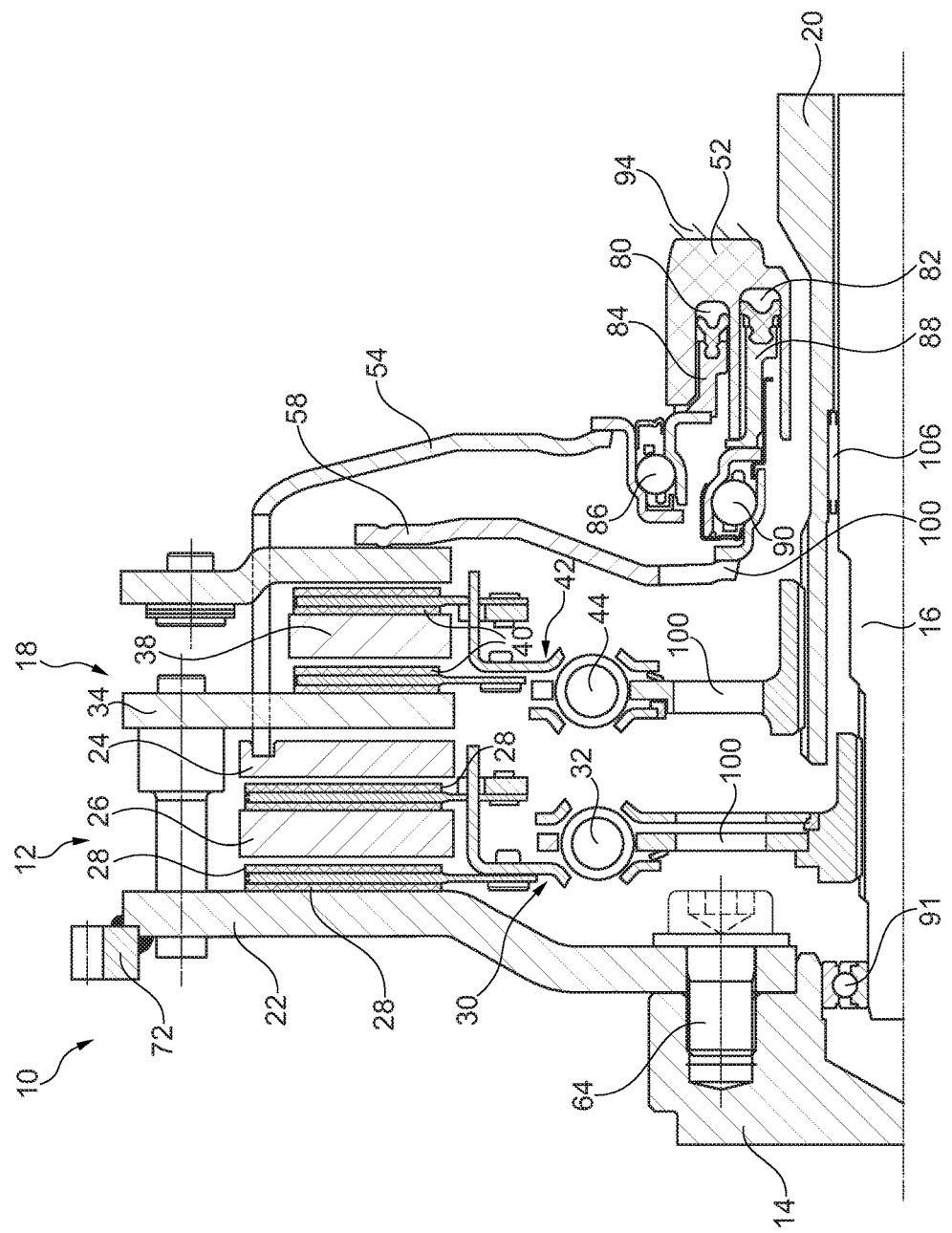
FIG. 7: a schematic cross-section of a duplex clutch in a seventh embodiment.

In the embodiment of the duplex clutch 10 shown in FIG. 7, compared to the embodiment of the duplex clutch 10 shown in FIG. 6, the clutch cover 48 is waived. In this exemplary embodiment the actuating system 52 is fastened directly at the transmission housing 94.

Figure 8:
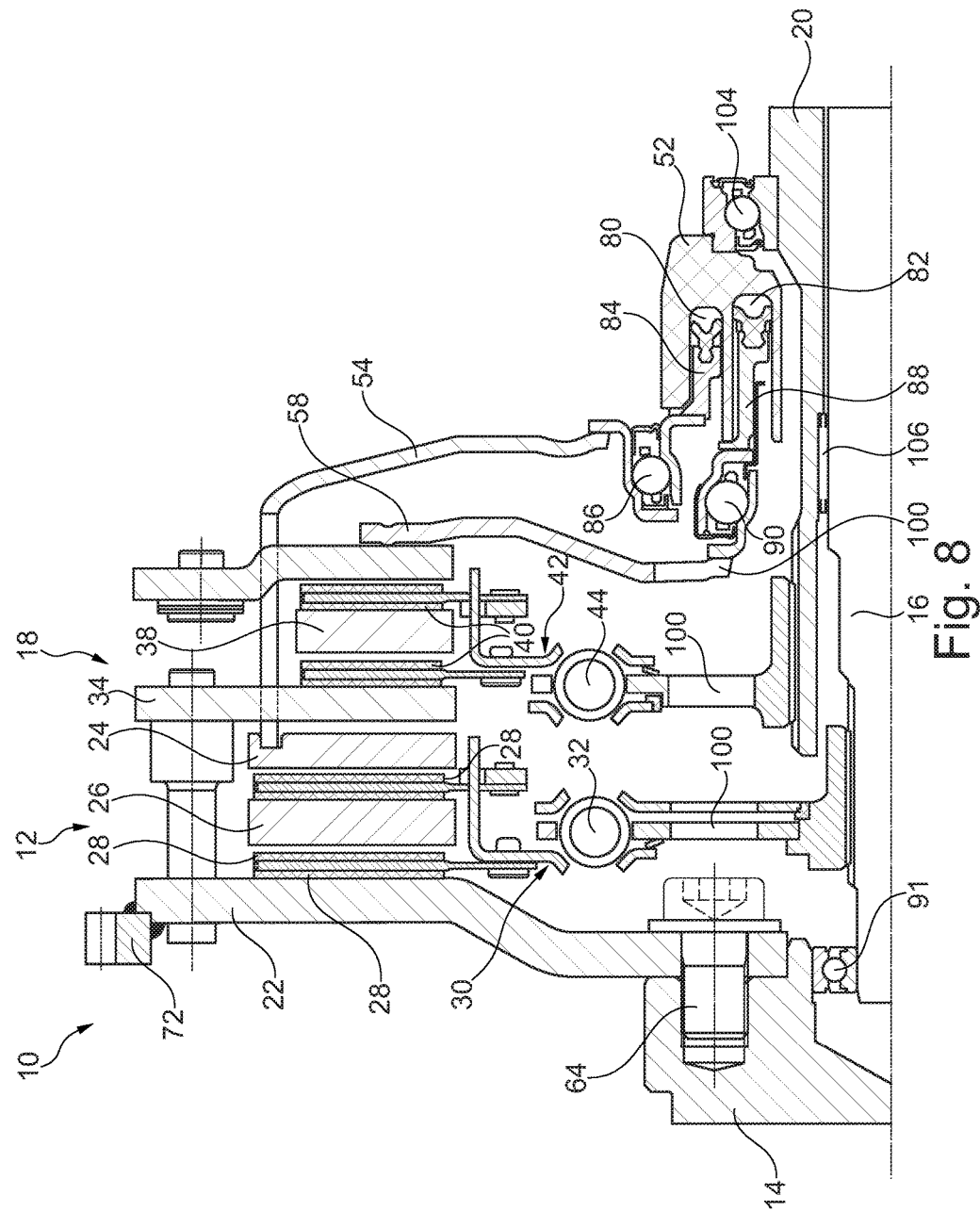
FIG. 8: a schematic cross-section of a duplex clutch in a eighth embodiment.

Compared to the embodiment shown in FIG. 7, in the exemplary embodiment shown in FIG. 8 the actuating system 52 is not connected to the transmission housing 94 but rests via a bearing 104 on the second transmission input shaft 20 in order to transfer radial forces and/or axial forces. Further, the second transmission input shaft 20 may be supported via a journal bearing 106 embodied as a needle bearing. Any unintentional rotation of the actuating system 52 can be prevented by torque-proofing and/or a torque support.

Figure 9:
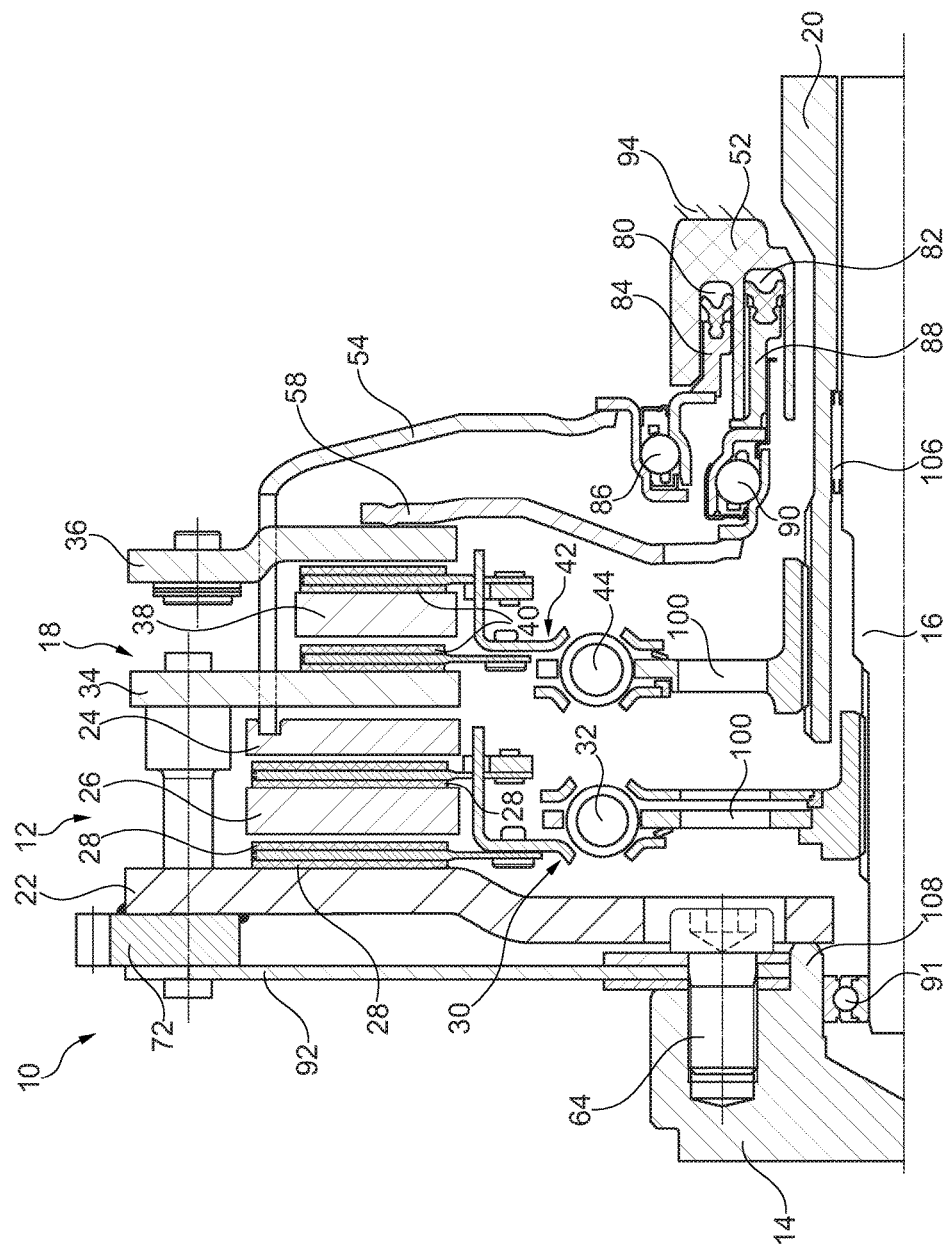
FIG. 9: a schematic cross-section of a duplex clutch in a ninth embodiment.

In the embodiment of the duplex clutch 10 shown in FIG. 9, compared to the embodiment of the duplex clutch 10 shown in FIG. 4, the torsional vibration damper 62 is replaced by a flex plate 92, with it being possible to dampen torsional vibrations by the first disk damper 32 and/or the second disk damper 44. The flex plate 92 is connected via the gear rim 72 to the first counter plate 22. Radially at the inside a support stop 108, embodied by the drive shaft 14, projects in the axial direction radially to the flex plate 92. When actuating the duplex clutch 10 with the help of the actuating system 52 the first counter plate 22 can be pressed against the support stop 108 such that the actuating forces can be transferred via the drive shaft 14. By the flexibility of the flex plate 92 in the axial direction, in case of axial oscillations and/or wobbling of the drive shaft 14, the first counter plate 22 can lift off the support stop 108 and/or tilt on the support stop 108 in order to compensate and/or dampen the axial vibrations and/or wobbling. A pilot bearing 91 for the transmission input shaft 16 is provided inside the support stop in the embodiment shown. If the pilot bearing 91 is waived or the pilot bearing 91 is arranged between the first counter plate 22 and the first transmission input shaft 16 the support stop 108 can be moved radially inwardly to an even greater extent. The stop area of the support bearing can also be arranged directly in the center of the drive shaft 14 on the axis of rotation. The stop area can be embodied as a swivel or ball area in order to allow slight tipping.

Figure 10:
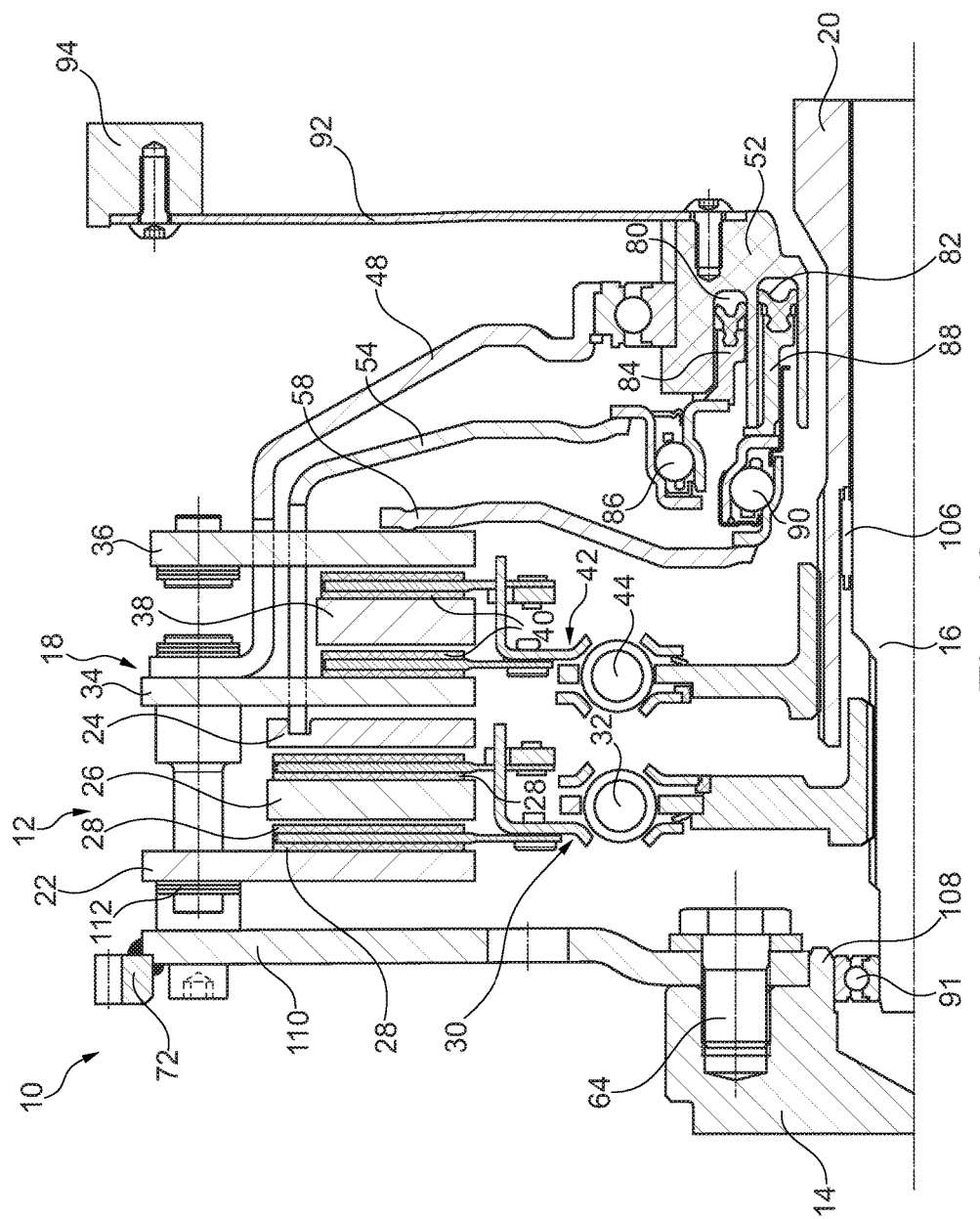
FIG. 10: a schematic cross-section of a duplex clutch in a tenth embodiment.

In the embodiment of the duplex clutch 10 shown in FIG. 10, compared to the embodiment of the duplex clutch 10 shown in FIG. 3, the torsional vibration damper 62 can be waived, allowing here also to dampen rotary vibrations by the first disk damper 32 and/or the second disk damper 44. A flywheel 110, for example embodied as a drive plate, is connected to the drive shaft 14, with the gear rim 82 also being connected thereto. The flywheel 110 is connected to the first counter plate 22 via flat springs 112, essentially extending tangentially. With the help of the flat springs 112 the duplex clutch 10 can be radially centered at the drive shaft 14. The flat springs 112 can provide axial flexibility like a flex plate in order to allow compensating and/or damping axial oscillations and/or wobbling of the drive shaft 14. In this exemplary embodiment the actuating system 52 is not only connected via a cap bearing 50 to the clutch cover 48 but also via a flex plate 92 to a transmission housing 94.

Figure 11:
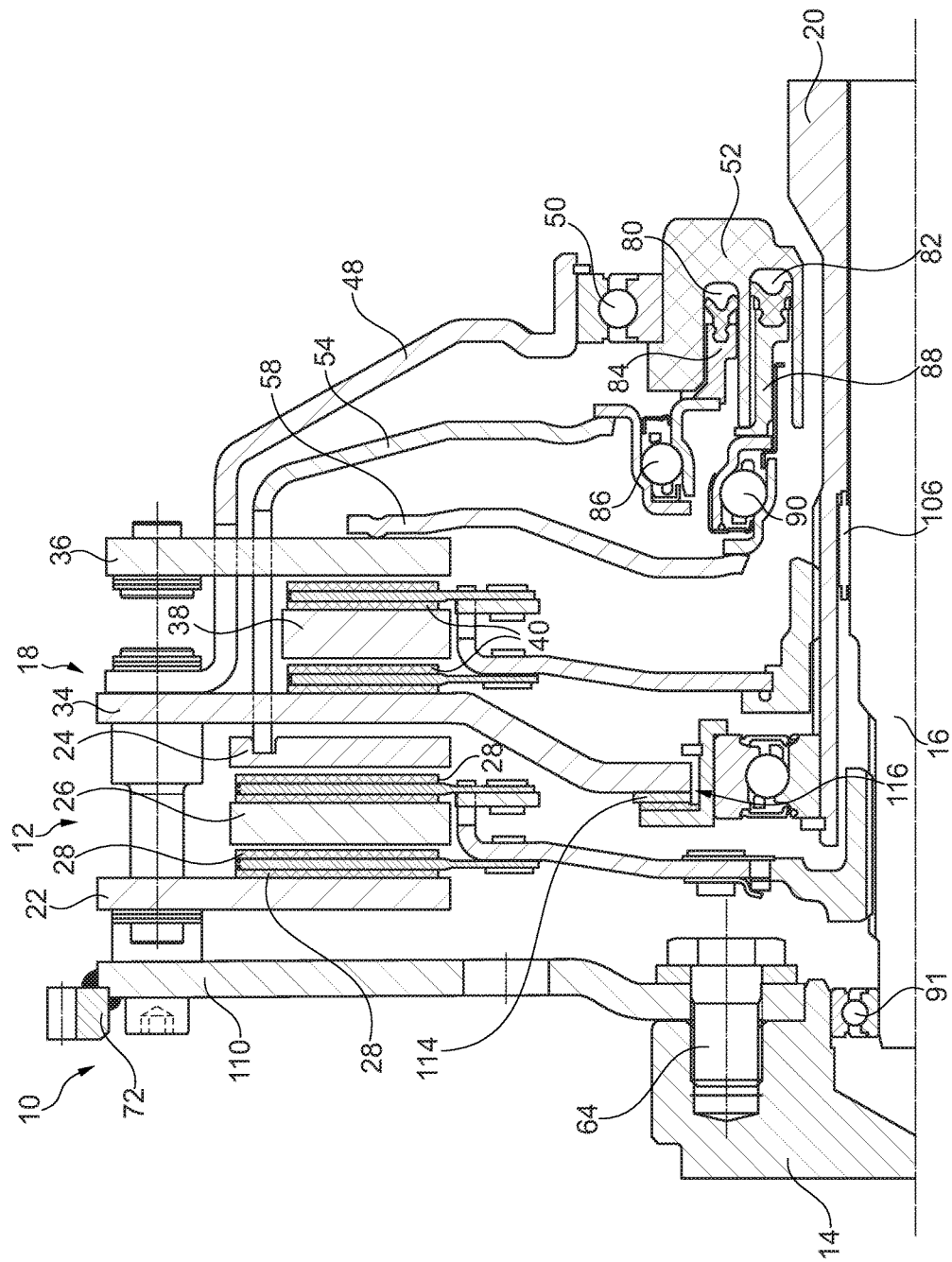
FIG. 11: a schematic cross-section of a duplex clutch in an eleventh embodiment.

In the exemplary embodiment shown in FIG. 11 a flywheel 110, for example embodied as a drive plate, is connected with the drive shaft 14, with the gear rim 72 also being connected thereto. The flywheel 110 is connected via flat springs 112, essentially extending tangentially, to the first counter plate 22. Alternatively the drive plate and the flat springs 112 can be replaced by a flex plate. With the help of the flat springs 112 the duplex clutch 10 can be radially centered at the drive shaft 14. The flat springs 112 may provide axial flexibility like a flex plate in order to allow compensating and/or damping axial oscillations and/or wobbling of the drive shaft 14. Simultaneously the second counter plate 34 is coupled via an axial slide bearing 114 to the support bearing 78 in order to form radially acting compensation of slide offset 116. The axial slide bearing 114 is stressed by forces of the pre-stressed flat springs 112. In this exemplary embodiment the actuating system 52 is connected via a cap bearing 50 to the clutch cover 48.

Figure 12:
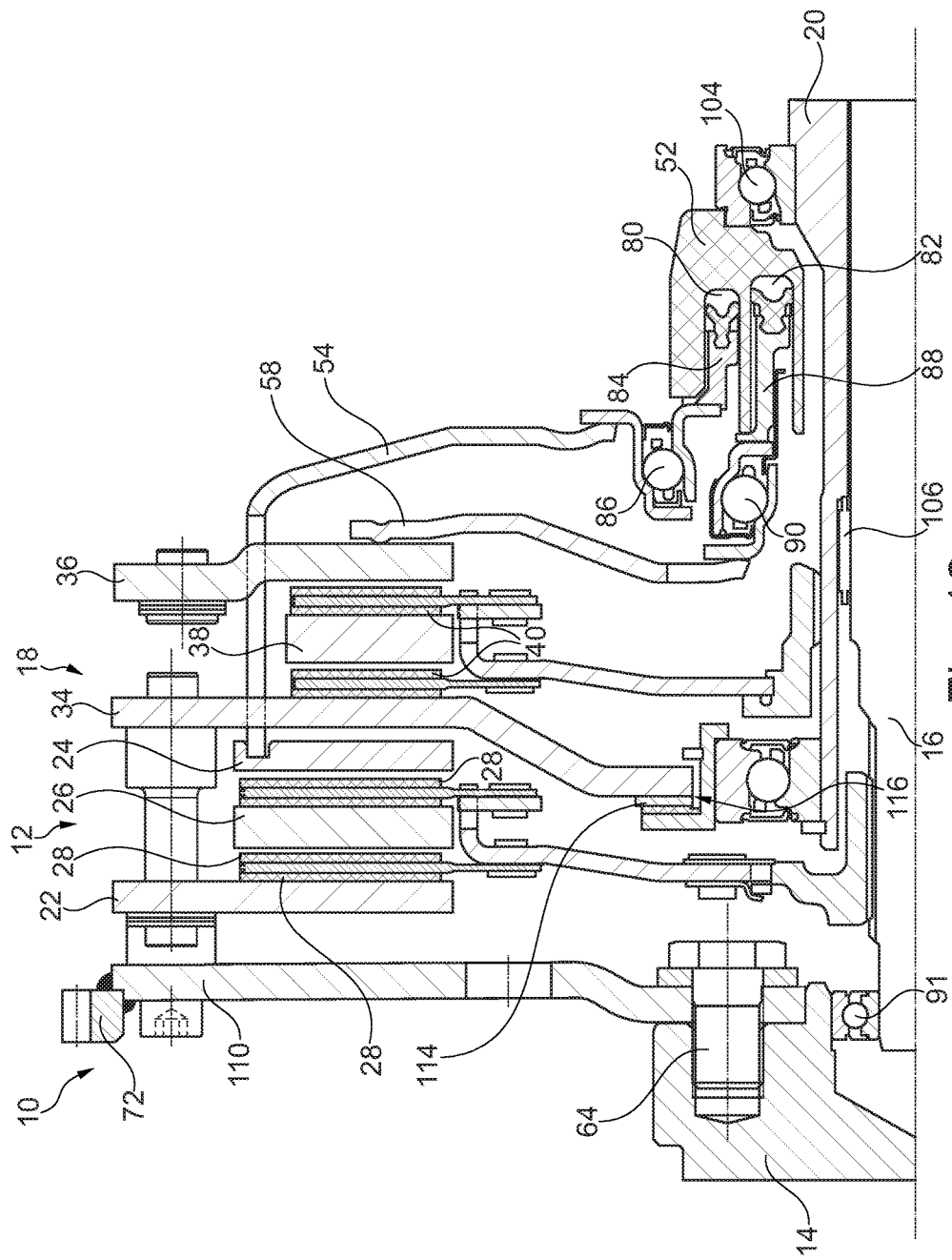
FIG. 12: a schematic cross-section of a duplex clutch in a twelfth embodiment.

In the embodiment of the duplex clutch 10 shown in FIG. 12, compared to the embodiment of the duplex clutch 10 shown in FIG. 11, the clutch cover 48 is waived. In this exemplary embodiment the actuating system 52 rests via a bearing 104 on the second transmission input shaft 20 for transferring radial forces and/or axial forces. Further, the second transmission input shaft 20 can rest via a journal bearing 106 embodied as a needle bearing at the first transmission input shaft 16. Any unintentional rotation of the actuating system 52 can be prevented by torque-proofing and/or a torque support. As indicated in FIG. 12, the second counter plate 34 is coupled via the axial slide bearing 114 to the support bearing 78 in order to embody a radially acting compensation of slide offset 116. When actuating the duplex clutch 10 with the help of the actuating system 52 the second counter plate 34 can be pressed against the axial slide bearing 114 so that the actuating forces can be transferred via the support bearing 78 to the second transmission input shaft 20.

Figure 13:
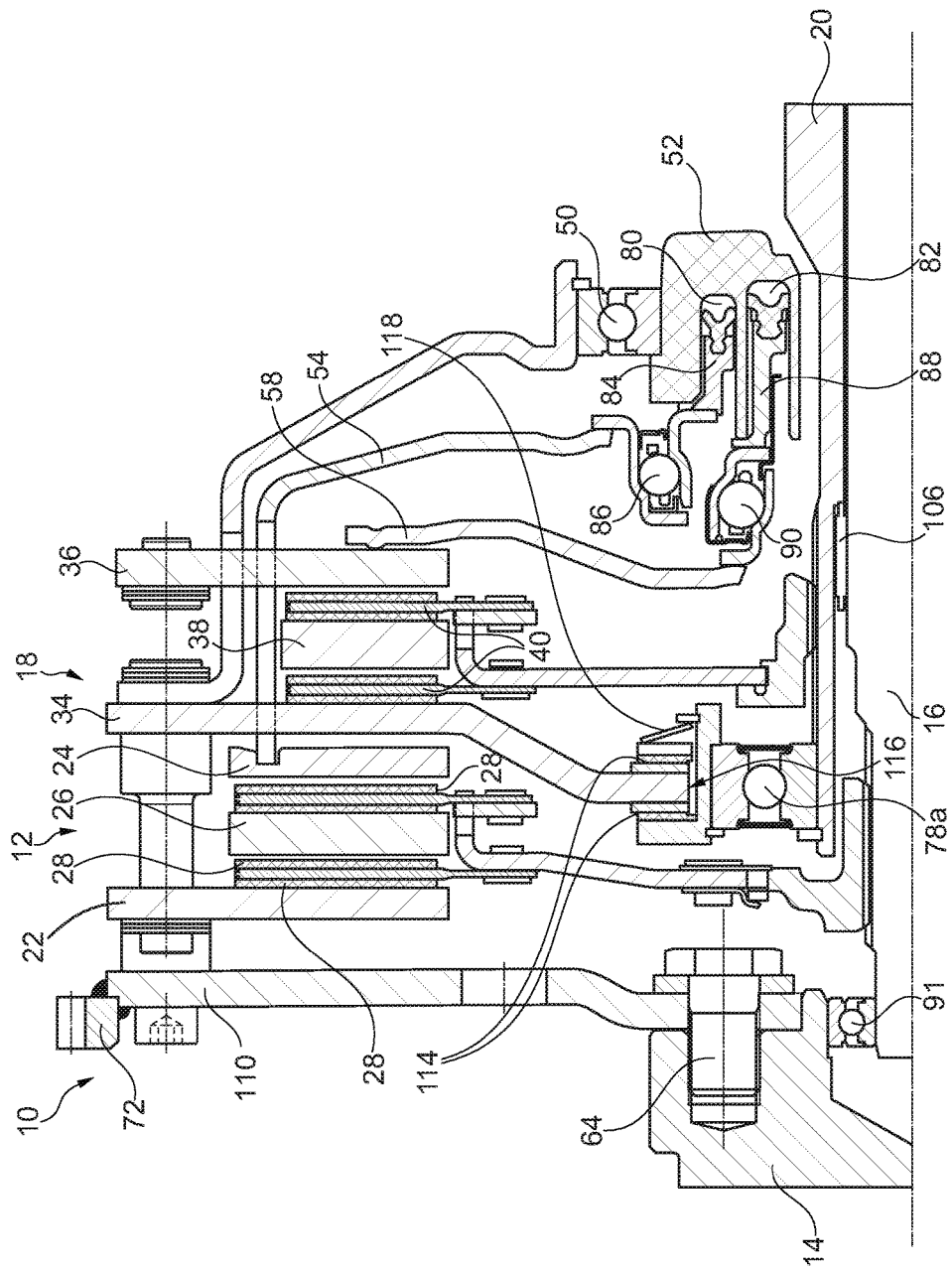
FIG. 13: a schematic cross-section of a duplex clutch in a thirteenth embodiment.

In the embodiment of the duplex clutch 10 shown in FIG. 13, compared to the embodiment of the duplex clutch 10 shown in FIG. 11, the second counter plate 34 is coupled via two axial slide bearings 114 to the support bearing 78 in order to form a radially operating compensation of slide offset 116. As shown in FIG. 13, one axial slide bearing 114 each is arranged at both sides of the second counter plate 34. In this exemplary embodiment the radially acting compensation of slide offset 116 is pre-stressed by a spring 118. It is possible that the compensation of slide offset 116 can be transferred by the duplex axial bearing arrangement in both directions. In this case a targeted pre-stressing of the flat spring 112 or the alternatively used flex plate 92 can be waived, even when the actuating system 52 rests on the clutch cover 48. However, here it is required that, in addition to the compensation of slide offset 116, also the connection between the compensation of the slide offset 116 and the support bearing 78, the connection between the support bearing 78 and the transmission input shaft 16, 20, and the support bearing 78 itself can transfer axial forces in both directions. For this purpose, particularly deep groove ball bearings 78a are well suited.

Figure 14:
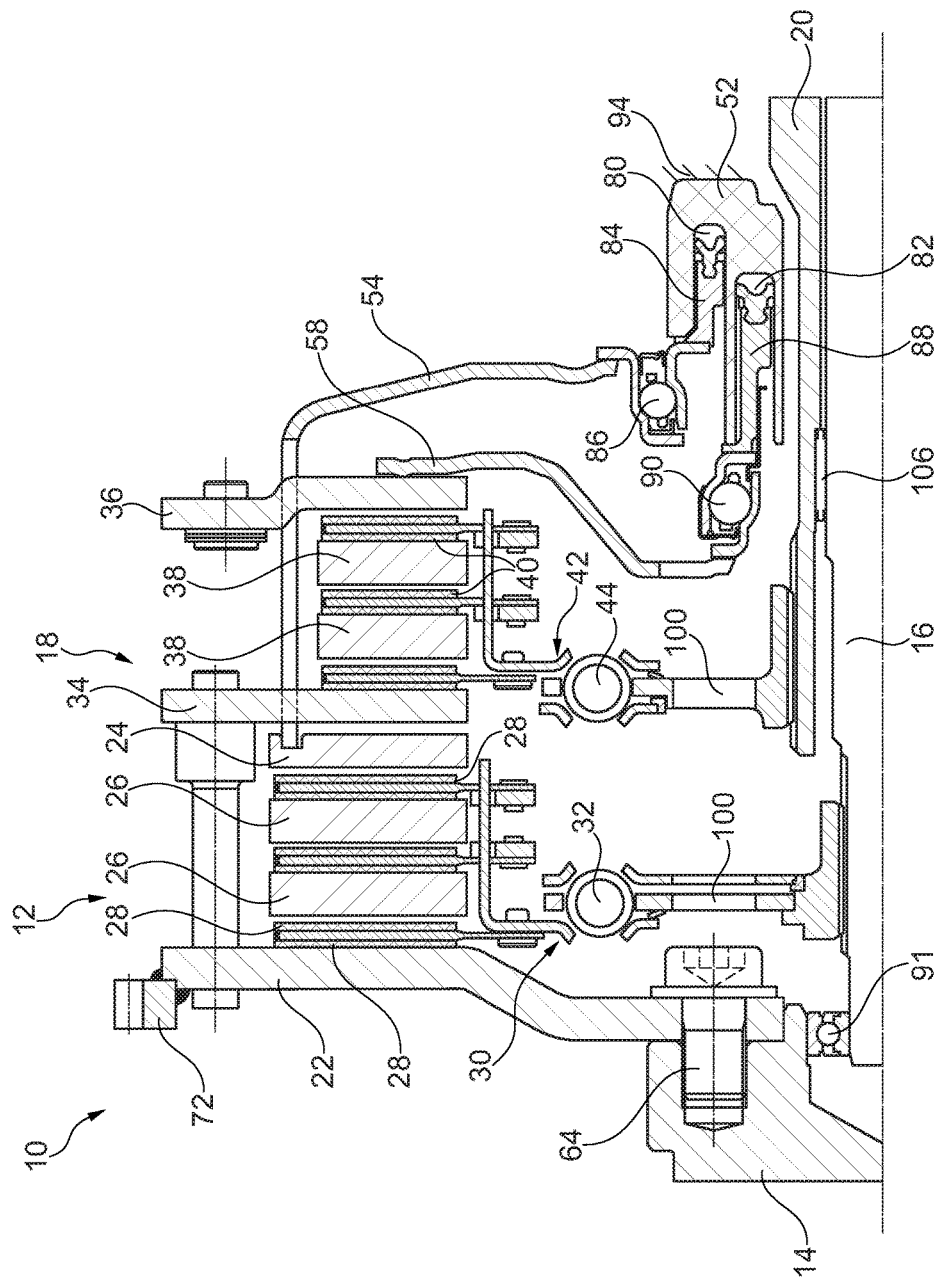
FIG. 14: a schematic cross-section of a duplex clutch in a fourteenth embodiment.

In the embodiment of the duplex clutch 10 shown in FIG. 14, compared to the embodiment of the duplex clutch 10 shown in FIG. 9, two first intermediate plates 26 and two second intermediate plates 38 are provided such that accordingly more first friction linings 28 and second friction linings 40 can be compressed. The effective friction area and the number of friction linings can be further increased thereby.

LIST OF REFERENCE CHARACTER

10 Duplex clutch
12 First partial clutch
14 Drive shaft
16 First transmission input shaft
18 Second partial clutch
20 Second transmission input shaft
22 First counter plate
24 First compression plate
26 First intermediate plate
28 First friction lining
30 First clutch disk
32 First disk damper
34 Second counter plate
36 Second compression plate
38 Second intermediate plate
40 Second friction lining
42 Second clutch disk
44 Second disk damper
46 Central plate
48 Clutch cover
50 Cap bearing
52 Actuating system
54 First actuating cup
56 Tensile element
58 Second actuating cup
60 Entraining ring
62 Torsional vibration damper
64 Connection means
66 Primary weight
68 Energy storage element
70 Secondary weight
72 Gear rim
74 Access opening
76 Fastening means
78 Support bearing
78a Deep groove ball bearing
80 First ring cylinder
82 Second ring cylinder
84 First actuating piston
86 First release bearing
88 Second actuating piston
90 Second release bearing
91 Pilot bearing
92 Flex plate
94 Transmission housing
96 Slide bearing
98 Spacer
100 Assembly opening
102 Roller bearing
104 Bearing
106 Journal bearing
108 Support stop
110 Flywheel
112 Flat spring
114 Axial slide bearing
116 Compensation for slide offset
118 Spring

The invention claimed is:

1. A duplex clutch for coupling a drive shaft of a motor vehicle to at least one of a first transmission input shaft or a second transmission input shaft of a motor vehicle transmission, the duplex clutch comprising:
a first partial clutch for coupling the drive shaft to the first transmission input shaft, with the first partial clutch comprising a first counter plate, at least one first intermediate plate axially displaceable in reference to the first counter plate, and a first compression plate axially displaceable in reference to the first counter plate and to the first intermediate plate for compressing first friction linings of a first clutch disk between the first counter plate and the first intermediate plate as well as between the first intermediate plate and the first compression plate;

a second partial clutch for coupling the drive shaft to the second transmission input shaft, with the second partial clutch comprising a second counter plate, at least one second intermediate plate axially displaceable in reference to the second counter plate, and a second compression plate axially displaceable in reference to the second counter plate and to the second intermediate plate for compressing second friction linings of a second clutch disk between the second counter plate and the second intermediate plate as well as between the second intermediate plate and the second compression plate;

a first actuating cup for displacement of the first compression plate; and a second actuating cup, embodied stiffly, for the displacement of the second compression plate, wherein the first and second partial clutches are actuated directly without any lever movements, and the first actuating cup engages the first compression plate without any pivotal motion, and the second actuating cup engages the second compression plate without any pivotal motion.

2. The duplex clutch according to claim 1, wherein at least one of the first clutch disk is connectable to the first transmission input shaft in a torque-transmitting fashion, with the first clutch disk comprising a first torsional vibration damper for the first friction lining between the first counter plate and the first intermediate plate as well as for the first friction lining between the first intermediate plate and the first compression plate, or the second clutch disk is connectable in a torque-transmitting fashion to the second transmission input shaft, with the second clutch disk comprising a second torsional vibration damper for the second friction lining between the second counter plate and the second intermediate plate as well as for the second friction lining between the second intermediate plate and the second compression plate.

3. The duplex clutch according to claim 1, wherein a clutch cover, connected to the first counter plate and the second counter plate, is provided for covering at least a portion of at least one of the first partial clutch or the second partial clutch, and the clutch cover is fastenable at a fastening site with at least one of the first counter plate or the second counter plate.

4. The duplex clutch according to claim 1, further comprising an actuating system for applying an actuating force upon at least one of the first actuating cup or the second actuating cup, with the actuating system being supported to transfer loads.

5. The duplex clutch according to claim 1, further comprising a spring element for a torque-proof fastening to the drive shaft with the spring element being connected to at least one of the first counter plate or to the second counter plate for introducing a torque provided by the drive shaft.

6. The duplex clutch according to claim 1, further comprising a support stop for supporting actuating forces acting in an axial direction upon the drive shaft, with the first counter plate being at least one of axially mobile or tippable in reference to the drive shaft, and the support stop is formed on at least one of the drive shaft or a component connected to the drive shaft or to the first counter plate.

7. The duplex clutch according to claim 1, wherein the first counter plate and the second counter plate are formed by a common central plate.

8. The duplex clutch according to claim 1, wherein at least one of the first counter plate or the second counter plate are supported via a support bearing on the at least one of the first transmission input shaft or the second transmission input shaft for transferring at least one of radial forces or axial forces.

9. The duplex clutch according to claim 8, wherein the second counter plate is connected via a radially acting compensation for slide offset to the support bearing via an axial bearing.

10. The duplex clutch according to claim 1, further comprising a torsional vibration damper connected to at least one of the first counter plate or the second counter plate for damping torsional vibrations introduced via the drive shaft, with the torsional vibration damper comprising at least one access opening for passing a fastening element, connecting the torsional vibration damper to the at least one of the first counter plate to the second counter plate, or at least one of the at least one of first counter plate or the second counter plate comprising an assembly opening for guiding through a connection element connecting the torsional vibration damper to the drive shaft, or at least one of the first clutch disk, the second clutch disk, or the second actuating cup comprising an assembly opening for guiding through a connection element for connecting the torsional vibration damper to the drive shaft, or a combination thereof.

11. The duplex clutch according to claim 1, wherein for transferring at least one of radial forces or axial forces the first counter plate rests on at least one of the drive shaft or a torsional vibration damper for damping torsional vibrations introduced via the drive shaft.

* * * * *